V. A. FYNN.
ALTERNATING CURRENT MOTOR.
APPLICATION FILED DEC. 26, 1916.

1,406,367.

Patented Feb. 14, 1922.

INVENTOR
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,406,367.  Specification of Letters Patent.  Patented Feb. 14, 1922.

Application filed December 26, 1916. Serial No. 138,793.

*To all whom it may concern:*

Be it known that I, VALÈRE A. FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to single-phase motors of the induction type.

One of my objects is to place the power factor of such machines under control in a novel and improved manner, and another is to provide improved means for operating such motors.

In carrying out my invention, I provide means for introducing into the secondary member, and preferably along the axis of the revolving field present in such machines when they are operated in the manner heretofore known, a direct current of preferably adjustable magnitude, for the purpose of controlling the power factor of the machine. I derive this direct current either from an outside source or, according to another feature of my invention, from the motor itself. I prefer to introduce this direct current into the induced member by means of brushes revolving at synchronous speed with respect to the primary inducing member. In order to start the machine, I provide means for varying the current in the induced member by changing the magnitude or phase of the effective voltage in, or the ohmic resistance of, the induced member along one or more of its axes, or by varying the terminal voltage of the machine, but, in all cases, I first bring the brushes to synchronism and connect them to a source of direct current E. M. F.

Figure 1:
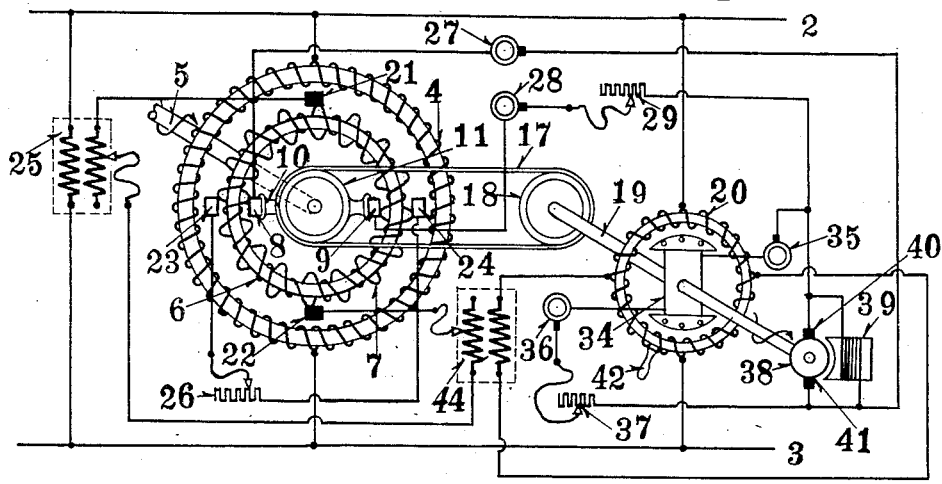
Figure 2:
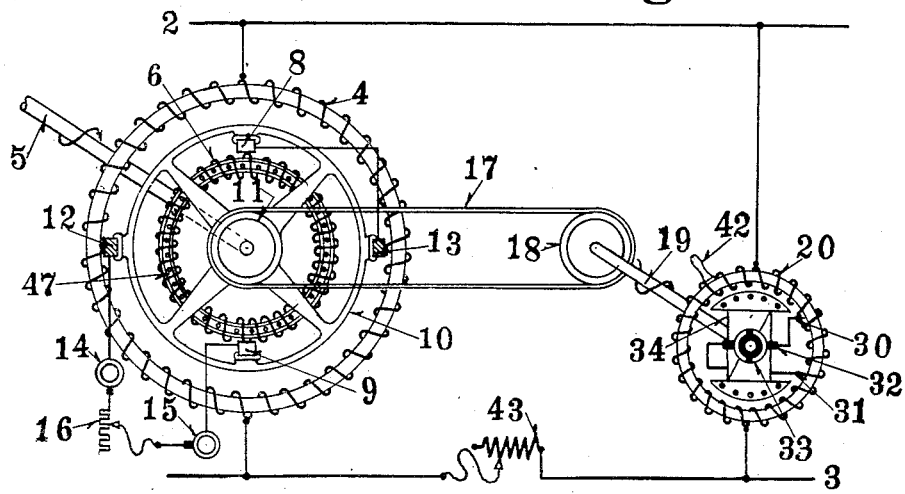

Referring to the accompanying drawings, Figure 1 shows one way of carrying the invention into practice in connection with a two-pole motor, while Fig. 2 shows a modification thereof.

Referring to Fig. 1, the primary member of the machine is stationary and provided with an inducing winding 4 connected to the mains 2, 3. The secondary is mounted on the motor shaft 5 and is adapted to revolve. It is provided with two independent commuted windings 6 and 7. The winding 7 co-operates with the stationary brushes 21, 22, 23, 24. The brushes 21, 22 permit the secondary to be closed along the axis of the primary magnetization and are the working brushes of the machine. The brushes 23, 24 permit the rotor to be closed along an axis displaced by 90 electrical degrees with respect to that of the primary magnetization and carry the rotor exciting currents. The working brushes 21, 22 are connected to the secondary of the variable ratio transformer 25, the primary of which is connected to the mains 2, 3, and in series therewith to the secondary of the variable ratio transformer 44, the primary of which is connected to an E. M. F. differing in phase from that of the line. By means of this arrangement the rotor can be short-circuited along its working axis, by cutting both secondaries out of circuit, or an E. M. F. of any desired phase and magnitude can be conductively introduced into this rotor axis by leaving more or less of one or both of the secondaries in circuit. The exciting brushes 23, 24 are connected over an adjustable resistance 26 by which means the resistance in the rotor exciting axis can be varied. In order to compensate this motor, I provide a second commuted winding 6 on the rotor and movable brushes 8, 9 adapted to co-operate with 6. I drive these brushes at synchronous speed by means of an auxiliary synchronous motor. The primary of this auxiliary motor carries the inducing winding 20 connected to the mains 2, 3 and is stationary but capable of being displaced through a certain angle by means of the handle 42. The primary of the variable ratio transformer 44 is connected to this inducing winding 20 at points displaced by 90 electrical degrees from those at which this winding is connected to the mains, so that when the synchronous motor is in operation an E. M. F. displaced by 90 degrees from the line E. M. F. is impressed on the transformer 44. The revolving member is mounted on the shaft 19 and has defined polar projections. It is provided with an exciting winding 34, made accessible by means of slip rings 35, 36 and brushes co-operating therewith. In practice, the slip rings are carried by the shaft 19. The excitation for the synchronous motor is provided by a direct-current generator, the armature 38 of which is mounted on the shaft 19 while its field magnet 39 is stationary, as are the brushes 40, 41 co-operating with the armature. The exciting current for the synchronous motor can be regulated by means of the adjustable resistance 37. This direct-current generator also supplies direct current to the brushes 8, 9 co-operating with the commuted winding 6 of the motor. These brushes are driven at synchronous speed by means of the pulley 18 keyed to the shaft 19, the belt 17 and the pulley 11 attached to the rocker-arm 10 which insulatingly carries the brushes 8, 9 and which is free to revolve about the shaft 5. These brushes 8, 9 are connected to the direct current generator by means of slip rings 27, 28 carried, in practice, by the shaft 5 and brushes co-operating with said slip rings. This circuit also comprises an adjustable resistance 29, by means of which the magnitude of the direct-current supplied to the synchronously revolving brushes 8, 9, can be adjusted.

The motor shown in Fig. 2 comprises a stationary primary member provided with the commuted winding 4, which does duty as main inducing winding and is connected to the mains 2, 3, through an adjustable inductance 43, and a secondary member mounted on the shaft 5 and provided with a commuted winding 6 and a squirrel-cage winding 47. A brush rocker 10, free to revolve about the shaft 5 and provided with a pulley 11, insulatingly carries the diametrically located brushes 8, 9 co-operating with the commuted winding 6, and the brushes 12, 13 displaced by 90 electrical degrees from the first and co-operating with the commuted winding 4 of the stator. The brushes 8 and 13 are directly interconnected, while brush 12 is connected to brush 9 by way of the slip rings 14, 15, brushes co-operating therewith, and an adjustable resistance 16. The slip rings 14, 15, are in practice insulatingly carried by the motor shaft 5. An auxiliary synchronous motor, the revolving member of which is mounted on the shaft 19, drives all of the brushes of the main motor by means of the pulley 18 keyed to shaft 19, the belt 17, and the pulley 11 attached to the rocker-arm 10. The stationary member of the auxiliary synchronous motor carries the primary winding 20 connected to the mains 2, 3, while the revolving member has defined polar projections and is provided with an exciting winding 34 connected to a two-part commutator 33 co-operating with stationary brushes 32 connected to a part of the primary stator winding 20 at points 30 and 31.

In explaining the operation of this machine, I will first refer to Fig. 1. It is known that the motor shown in that figure, when not provided with the brushes 8, 9, and with brushes 21, 22 and 23, 24 short-circuited will run at a nearly synchronous speed, decreasing its speed very little with increasing load up to the breakdown point. The resultant field in this machine is of nearly constant magnitude, produced partly by the stator and partly by the rotor, when the latter is in motion, and always revolves at synchronous speed in the direction of rotation of the rotor. As long as the machine is in operation, this resultant revolving field is produced by a rotor exciting current of line frequency along the axis 23, 24, an equal rotor current along the axis 21, 22, and an idle stator current of line frequency equal to about twice the magnetizing current which the machine would take with the rotor on open circuit. Under load, this machine further carries a line frequency load current in the rotor along the axis 21, 22, and a line frequency load current in the stator of such a magnitude and direction as to equal and oppose the magnetization produced by the rotor load current. Now, according to this invention, I produce the resultant synchronously revolving magnetization of the machine by means of a direct current, which I introduce into the rotor by way of the synchronous revolving brushes 8, 9. These brushes are driven at synchronous speed by means of the auxiliary synchronous motor, 20, 34, and the direct-current excitation for the main motor is derived from the direct-current generator 38, 39, which also supplies the direct-current excitation for the synchronous motor. I furthermore prefer to so arrange matters that in normal operation the axis of the brushes 8, 9 can be made to always coincide with the axis of the revolving field produced in the machine by means of the alternating rotor and stator exciting currents referred to. To this end I, for instance, so hold the stator of the synchronous motor that it can be moved through a certain angle by means of the handle 42. This movement will be instantly and exactly transmitted to the brushes 8, 9, when driven by the synchronous motor. Such a movement of the stator will momentarily increase or decrease the brush speed, but the brushes will resume their synchronous rotation as soon as the stator has come to rest. In this way I can make the axis of the brushes 8, 9 coincide with, say the axis along which the primary is connected to the mains at any part of the cycle I select.

The revolving field produced by the alternating currents in a motor of this type, is produced only from the primary where the magnetizing current in that member is a maximum (on the assumption that all E. M. F.'s, circuits and fields follow the sine law), while one quarter of a period later it is produced only from the secondary, and at that time the primary magnetizing current is zero. The magnetizing current lags by about one-quarter of a period behind the terminal E. M. F. For the best power factor, for instance, the preferred position of the axis of the brushes 8, 9 conveying the direct current to the secondary, can therefore be defined by saying that it shall coincide with the axis along which the primary is connected to the supply, whenever the terminal E. M. F. or the E. M. F. of the supply is about equal to zero. This, or any other position of the brush axis, can be secured by moving the stator of the synchronous motor 20, 34 by means of the handle 42.

With the brush axis revolving, for instance, in this preferred position, and with no direct current E. M. F. impressed on the brush circuit, the resultant revolving field of the motor will be entirely due to the alternating magnetizing currents circulating in the machine. If a small direct current E. M. F. is impressed on the circuit of the brushes 8, 9, then this field will be produced in part by the direct current conducted into the secondary and in part by the alternating magnetizing currents. The magnitude of the direct-current E. M. F. can be so chosen that the whole of the resultant revolving field of the machine is produced by the injected direct current, in which case all the alternating magnetizing currents usually present in single-phase induction motors will be eliminated and the machine will operate with a power factor near unity. An increase of the direct-current E. M. F. will cause the machine to take leading currents. In this manner the power factor of the machine is placed under the control of the operator and the efficiency of the motor is greatly increased.

Single-phase motors of the induction type have heretofore been compensated either by injecting into the working circuit of the secondary member an E. M. F. opposing the reactance E. M. F.'s in that circuit, or by injecting into the field circuit of the induced member an E. M. F. of practically the same phase as that of the supply for the purpose of changing the phase of the motor field, thus changing the phase of the back E. M. F., and, in consequence, changing the phase relation of the rotor load current to the rotor working E. M. F., and thus adjusting the phase relation of the stator load current and the terminal voltage, since the stator and the rotor along the working axis are in ordinary transformer relation. These methods amount to a more or less direct influencing of the phase of the rotor working currents, and merely alter the phase relations of the rotor and stator currents to their E. M. F.'s but do not eliminate any of said currents. When the magnitude of the direct current introduced into the secondary winding of my improved rotor is so chosen as to produce the whole of the revolving field in the motor, then all of the rotor and stator alternating exciting or magnetizing currents are elimated, leaving nothing but load currents.

In Fig. 2, the rotor carries a winding 47, short-circuited along a plurality of axes which are stationary with respect to the secondary member, instead of being short-circuited along a plurality of axes stationary with respect to the primary member, as is the case in Fig. 1. As a result, the primary idle and load currents remain the same, but the rotor exciting current has now one component of line plus speed frequency and another component of slip frequency, while the rotor current is also made up of two such components. This machine can be compensated in exactly the same manner by introducing into the commuted winding 6 of the rotor a direct current by means of the brushes 8, 9 rotated at synchronous speed, and the magnitude of this current can be so chosen as to eliminate the alternating no-load or exciting currents in stator and rotor. This result will be achieved irrespective of the source from which this direct current is derived. In Fig. 2, I derive this current from the stator itself, by causing the brushes 12, 13, displaced by 90 electrical degrees with respect to the brushes 8, 9, to co-operate with the primary winding 4, which has been carried out as a commuted winding for this purpose. I am able to derive the direct current from the stator in this manner because the combination of the stationary commuted winding 4 with the brushes 12, 13 revolving at synchronous speed and connected to the brushes 8, 9 displaced by 90 electrical degrees from 12, 13 and so as to produce a unidirectional magnetization through the machine along their axis by way of the commuted winding 6, constitutes a single-phase rotary converter, the operation of which is improved by the presence of the squirrel cage winding 47 on the revolving member. The magnitude of the direct current derived from the primary commuted winding 4 can be regulated, for instance, by means of the adjustable resistance 16. In Fig. 2, the synchronous motor driving the brush gear is of the self-exciting type, deriving its excitation from a small portion of the main motor winding 20 and rectifying this alternating exciting current by means of the stationary brushes 32 and the revolving two-part commutator 33, before utilizing same in the exciting winding 34.

In order to start that form of my improved motor, in which the secondary member is closed along axes which are stationary with respect to the inducing member, as in Fig. 1, I prefer to interrupt all the secondary circuits; bring the synchronous motor and the brushes it drives up to speed; connect the primary of the motor to the mains; excite the secondary by means of a direct-current supplied to the revolving brushes 8, 9 and adjust the magnitude of this direct current, for instance, so as to eliminate all lagging magnetizing currents in the primary; conductively introduce into the working circuit 21 22 of the secondary an E. M. F. of about the same phase as, and of opposite direction to, that induced in said circuit from the primary, by connecting the brushes 21, 22 to the secondary of the transformer 25, the primary of which is connected to the mains 2, 3; preferably so selecting the magnitude of this auxiliary E. M. F. as to reduce the current in the secondary to a minimum; and reduce the magnitude of the conductively introduced E. M. F., thus increasing the rotor current and the torque of the machine. The latter will start, finally reaching a speed near the synchronous when the auxiliary E. M. F. has been reduced to zero.

Having started the machine in the manner described, I can operate it with the secondary closed along one axis, either on itself or on a resistance or on a source of auxiliary E. M. F. If closed on an auxiliary E. M. F., I can vary the speed of the machine by varying the magnitude or the direction of said E. M. F.

I can also start this motor by conductively introducing an E. M. F. into the secondary in the manner described and simultaneously closing that member along another axis on an adjustable resistance, such as 26, reducing this resistance as the auxiliary E. M. F. is reduced. As an alternative I can discard the auxiliary E. M. F. and close the induced member along the axis 21, 22, or along the axes 21, 22 and 23, 24, over adjustable resistances diminishing their values with increasing motor speed.

In speaking of the normal operation of the machine, it has been said that it was preferred to so revolve the brushes 8, 9 as to make their axis coincide with that of the magnetization produced by the inducing member every time the line voltage comes near its zero value. In this position of the brush axis, all the alternating magnetizing currents in the motor can be reduced to negligible values or even entirely eliminated, and the torque conditions will also be very favorable because the alternating motor working currents will, under normal operating conditions, be about in phase with the line voltage and reach their maximum values just about the time when their axis lies at right angles to that of the field produced by the direct current. At starting, the motor currents along the working axis will lag very considerably behind the line E. M. F., thus reducing the torque per ampere. In order to raise this torque, it is most convenient to so select or adjust the phase of the E. M. F. conductively introduced into the induced member at starting as to bring the current in the working axis of the motor more nearly in phase with the line voltage. One way of bringing this about is to introduce into the induced member at starting an E. M. F. differing in phase from that induced therein from the primary. The E. M. F. induced by the primary 4 along the axis 21, 22 of 7 is practically of the same phase as the line E. M. F. When I desire to change the phase of the resultant E. M. F. in 13 along this axis I introduce into this circuit an E. M. F. in quadrature with the line which I derive from the winding 20 of the synchronous motor by means of the variable ratio transformer 44. By connecting the secondary of this transformer in series with that of the transformer 25 and varying the effective turns of one or both of these transformers I can adjust the resultant E. M. F. in 4 along the axis 21, 22 to any desired extent. The resultant E. M. F. in that axis can be adjusted in the same way in normal operation as well as at starting. When no change in speed, but only a phase adjustment is required then the transformer 25 can be cut out and only the transformer 44 used.

In practice, it would be preferable not to make use of the pulleys 11, 18, and the belt 17, but to mount the brush rocker 10 directly on the auxiliary motor shaft 19, and place the shafts of the main and of the auxiliary motor in axial alinement. A convenient way of arranging such a combination is to make the shaft of the auxiliary motor hollow, and journal same on the shaft of the main motor.

It will be observed that in normal operation the speed of the brushes 13, 14 when considered with respect to the primary inducing winding, will be synchronous, while the speed of the exciting or compensating brushes 8, 9, with respect to the secondary will always be equal to the slip speed. In all cases, the brushes will revolve in the same direction as the secondary.

Reference is made to my copending application, Serial No. 138,792, wherein I claim broadly in connection with motors of the same type as herein described, means for revolving the brushes at such speed as to cause the relative speed of the brushes and the inducing member to equal the synchronous speed.

Having fully described my invention, what I claim as new and desire to secure by Letters Patent of the United States is:

1. In a single-phase motor, the combination of an inducing member, an induced member provided with a winding closed along at least one axis, a commuted winding for the induced member, brushes co-operating with said winding, means for supplying direct current to said brushes, and means for revolving the brushes at a speed equal to the synchronous speed of the motor.

2. In a single-phase motor, the combination of an inducing member, an induced member provided with a winding closed along at least one axis stationary with respect to the inducing member, a commuted winding for the induced member, brushes co-operating with said winding, means for supplying direct current to said brushes, and means for revolving the brushes at a speed equal to the synchronous speed of the motor.

3. In a single-phase motor, the combination of an inducing member, an induced member provided with a winding closed along a plurality of axes, a commuted winding for the induced member, brushes co-operating with said winding; means for supplying direct current to said brushes, and means for revolving the brushes at a speed equal to the synchronous speed of the motor.

4. In a single-phase motor, the combination of a stationary inducing member, a revolving induced member provided with a winding closed along at least one axis, a commuted winding for the induced member, brushes co-operating with said winding, means for supplying direct current to said brushes, and means for revolving the brushes at a speed equal to the synchronous speed of the motor.

5. The method of starting an alternating current motor having an inducing member, an induced member provided with a commuted winding and a second winding and revolvable brushes co-operating with said commuted winding, which comprises driving the brushes at synchronous speed, connecting the inducing member to the alternating current supply mains, supplying direct current to the brushes, and varying the current in the circuit comprising the second winding on the induced member.

6. The method of starting an alternating current motor having an inducing member, an induced member provided with a commuted winding and a second winding, and revolvable brushes co-operating with said commuted winding, which comprises driving the brushes at synchronous speed, connecting the inducing member to the alternating current supply mains, supplying direct current to the brushes, and impressing on the second winding on the induced member an E. M. F. opposed in direction to that induced therein by the inducing member, and reducing the magnitude of said impressed E. M. F.

7. The method of starting an alternating current motor having an inducing member, an induced member provided with a commuted winding and a second winding, and revolvable brushes co-operating with said commuted winding, which comprises driving the brushes at synchronous speed, connecting the inducing member to the alternating current supply mains, supplying direct current to the brushes of such magnitude as to eliminate the lagging magnetizing current in the inducing member, and varying the current in the circuit comprising the second winding on the induced member.

8. The method of starting an alternating current motor having an inducing member, an induced member provided with a commuted winding and a second winding, and revolvable brushes co-operating with said commuted winding, which comprises driving the brushes at synchronous speed, connecting the inducing member to the alternating current supply mains, supplying direct current to the brushes of such magnitude as to eliminate the lagging magnetizing current in the inducing member, and impressing on the second winding on the induced member an E. M. F. opposed in direction to that induced therein by the inducing member, and reducing the magnitude of said impressed E. M. F.

9. In a single-phase motor, the combination of an inducing member, an induced member provided with a winding closed along one axis, means for conductively impressing an alternating E. M. F. on the induced member along said axis, a commuted winding for the induced member, brushes co-operating with said winding, means for supplying direct current to said brushes, and means for revolving the brushes at a speed equal to the synchronous speed of the motor.

10. In a single-phase motor, the combination of a stationary inducing member, a revolving induced member provided with a winding closed along one axis by means of stationary brushes, means for conductively impressing an alternating E. M. F. on said brushes, a commuted winding for the induced member, brushes co-operating with said winding, means for supplying direct current to said brushes, and means for revolving the brushes at a speed equal to the synchronous speed of the motor.

11. In a single-phase motor, the combination of a stationary inducing member, a revolving induced member provided with a commuted winding closed along one axis by means of stationary brushes, the axis of said brushes coinciding with the axis of magnetization of the inducing member, means for conductively impressing an alternating E. M. F. on said brushes, a commuted winding for the induced member, brushes co-operating with said winding, means for supplying direct current to said brushes, and means for revolving the brushes at a speed equal to the synchronous speed of the motor.

In testimony whereof, I have hereunto set my hand and affixed my seal in the presence of the two subscribing witnesses.

VALÈRE A. FYNN. [L. S.]